June 21, 1955
C. N. WOODS
2,711,298
MACHINE TOOL MOTOR MOUNT
Filed April 25, 1952
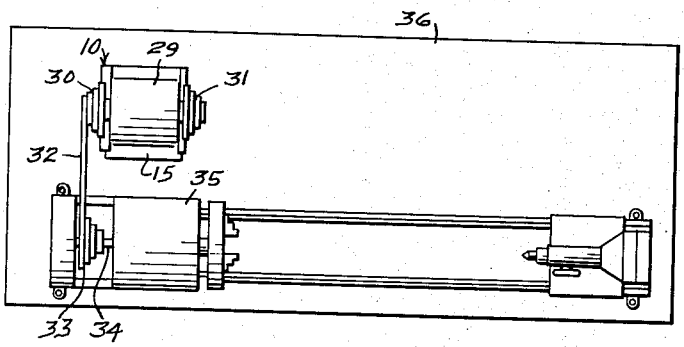
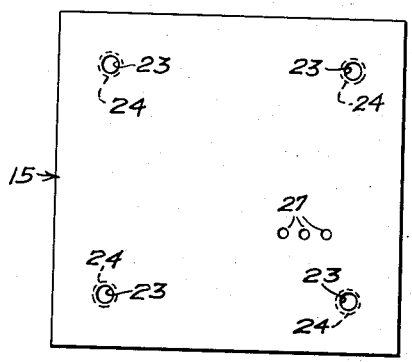
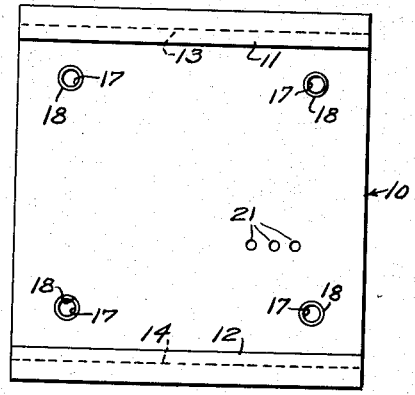
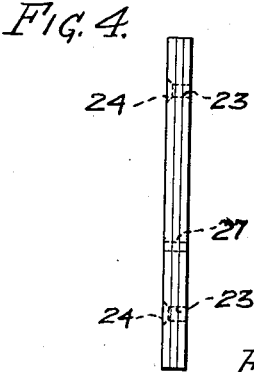
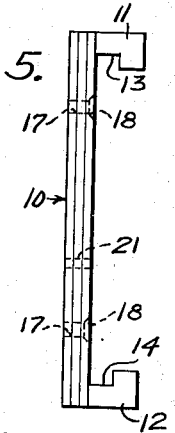
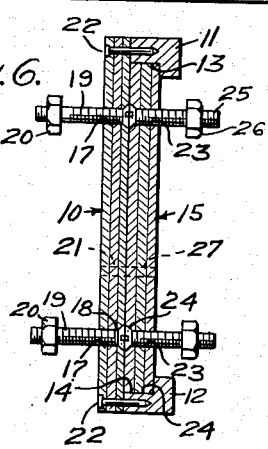
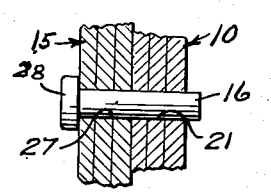
INVENTOR.
CARL N. WOODS
BY *Victor J. Evans & Co.*
ATTORNEYS

United States Patent Office 2,711,298
Patented June 21, 1955

2,711,298
MACHINE TOOL MOTOR MOUNT
Carl N. Woods, Seattle, Wash.

Application April 25, 1952, Serial No. 284,419

1 Claim. (Cl. 248—23)

This invention relates to machine tools and particularly a plurality of tools, such as in a small shop, and in particular a motor mounting device whereby one motor may be moved from one machine to another and readily positioned thereon for operating the machine.

The purpose of this invention is to provide means for mounting a motor on a machine tool, bench lathe, or the like wherein instead of being aligned with a line shaft a plurality of machines may be spotted in different positions and, at the same time, operated by a common motor.

A mechanic in a comparatively small shop works on only one machine at a time and at this time motors on other machines in the shop are idle. In numerous instances the cost of the motor is equivalent to that of the machine and, for this reason, it is desirable to use the same motor to operate all machines in a shop. With this thought in mind this invention contemplates a motor mounting which is formed in two sections with one section permanently attached to a motor and with the other section attached to a machine tool, bench, or the like whereby with a plurality of such sections mounted on machine tools, the motor with the section attached thereto may readily be moved from one machine to another.

The object of this invention is, therefore, to provide means for forming a motor mounting whereby one motor may readily be moved from one machine to another.

Another object of the invention is to provide a motor mounting to facilitate transferring a motor from one machine to another wherein the mounting aligns the motor with operating parts of the machine so that it is not necessary to align the motor each time it is moved from one machine to another.

A further object of the invention is to provide a motor mounting in which the position of a motor is reversible whereby with cone pulleys on both ends of the motor shaft it is only necessary to turn the motor around to reverse the operation of the machine.

A still further object of the invention is to provide an improved motor mounting which is of a simple and economical construction.

With these and other objects and advantages in view the invention embodies a base plate having rails with grooves in the inner surfaces adapted to be attached to a machine tool or the like, a motor mounting plate adapted to be slidably held in the base plate and also adapted to be attached to a motor, and a pin adapted to be positioned in spaced openings of the plates for retaining the plates in adjusted positions.

Other features and advantages of the invention will appear from the following description taken in connection with the drawing, wherein:

Figure 1 is a plan view illustrating a motor in the improved mounting of this invention with the motor positioned on the bed of a bench lathe or on a flat panel upon which lathe elements are also mounted and wherein the motor is positioned to drive a spindle in the head stock of the lathe.

Figure 2 is a plan view showing the motor carrying section of the improved motor mounting.

Figure 3 is a plan view showing the base of the motor mounting.

Figure 4 is an end elevational view showing the motor carrying plate of the mounting, as shown in Fig. 2.

Figure 5 is an end elevational view of the base shown in Fig. 3.

Figure 6 is a typical cross section through the improved motor mounting showing the parts assembled and showing bolts extended from the parts for attaching the base to a machine tool and for attaching the motor carrying plate to the motor.

Figure 7 is a detail with the parts shown on an enlarged scale illustrating a pin for retaining the parts in adjusted positions.

Referring now to the drawings wherein like reference characters denote corresponding parts the improved motor mount of this invention includes a base plate 10 having rails 11 and 12 with recesses 13 and 14, respectively in the inner surfaces on two of the edges thereof, a motor carrying plate 15 and a pin 16.

The base 10 is provided with a plurality of bolt holes 17, the inner ends of which are countersunk as indicated by the numeral 18 and in which bolts 19 with nuts 20 thereon are positioned. The plate 10 is also provided with a series of openings 21 that are positioned to receive the pin 16.

In the design shown the base 10 is formed with a plurality of laminated plates or sheets which may be of metal, plastic, or a suitable combination of elements and, as illustrated in Fig. 6, the rails 11 and 12 are secured to the edges of the plates with fasteners 22.

The motor carrying plate 15 is also provided with bolt holes 23 having countersunk inner ends 24 in which bolts 25 with nuts 26 thereon are positioned. The plate 15, which is also formed of laminated metal, plastic, or other suitable material, is also provided with spaced openings 27 that are positioned to register with the openings 21 of the base 10 whereby the pin 16, which is provided with a head 28 may be positioned to retain the motor in adjusted positions upon the base.

It will be understood that a motor of any suitable type or design may be mounted upon the plate 15 and in Fig. 1 a motor 29 having cone pulleys 30 and 31 on the ends of the shaft thereof is positioned upon the plate 15 and the base 10, in which the plate 15 is mounted is positioned whereby a belt 32, trained over the pulley 30, is positioned to extend over an oppositely positioned cone pulley 33 on the spindle 34 of a head stock 35 of a bench lathe or the like.

In this design the parts are mounted upon a bench as indicated by the numeral 36 and it will be understood that the parts may be horizontally or vertically positioned as may be desired.

It will be understood that the base 10 and plate 15 may be formed of plates or sheets of plastic or other material, as illustrated in Fig. 7, or of laminated sections as shown in Figs. 4, 5, and 6.

With the motor mounted in this manner a motor of a lathe, drill press, or other machine tool may be positioned with the axis of the motor parallel to the axis of the spindle of the tool and the same belt may be used for different tools or belts of different length may be provided. It will also be understood that the angle of the base 10 in relation to a bench or tool may be adjusted to compensate with the position of the spindle or shaft to be driven by the motor.

It will be understood that modifications, within the scope of the appended claim may be made in the motor mounting without departing from the spirit of the invention.

What is claimed is:

In a motor mounting, a base plate, a pair of side rails extending from one side of said base plate, securing elements extending through said base plate and into engagement with said rails, there being a recess in the inner surface of each of said rails, said recesses defining opposed lips, the edges of said rails being flush with the outer edges of said base plate, a motor carrying plate arranged contiguous to the outer surface of said base plate, said motor carrying plate snugly engaging said recesses and said lips overlying said motor carrying plate, there being a plurality of spaced apart holes in said base plate, the inner ends of said holes being countersunk, bolts extending through said holes and having nuts arranged in engagement therewith, said bolts having enlarged heads on their inner ends seated in the countersunk portions of said holes whereby said heads are flush with a surface of said base plate, there being a series of openings in said base plate intermediate the edges thereof, there being a series of spaced openings in said motor carrying plate registering with the openings in said base plate, a pin extending through one of said openings and having an enlarged head on an end thereof, said base plate including a plurality of superposed sheets, said sheets all being flat on both sides, said sheets having the same size, said motor carrying plate being provided with a plurality of holes having countersunk inner ends, bolts extending through said last named holes and having nuts arranged in engagement therewith, enlarged heads on the inner ends of said last named bolts seated in said countersunk holes whereby said heads are flush with a surface of said motor carrying plate, said motor carrying plate comprising a plurality of sheets all of the same size, all of said last named sheets being flat on both sides, the sheets of said motor carrying plate being smaller than the sheets of said base plate.

References Cited in the file of this patent

UNITED STATES PATENTS

| | | |
|---|---|---|
| 596,280 | Short | Dec. 28, 1897 |
| 1,680,967 | Berry | Aug. 14, 1928 |
| 1,801,735 | Glatt | Apr. 21, 1931 |
| 1,815,362 | Pinson | July 21, 1931 |
| 2,102,560 | Kimmich | Dec. 14, 1937 |

FOREIGN PATENTS

| | | |
|---|---|---|
| 578,921 | Great Britain | July 17, 1946 |